J. G. PERRY.
Sausage Stuffer.
No. 39,244.
Patented July 14, 1863.
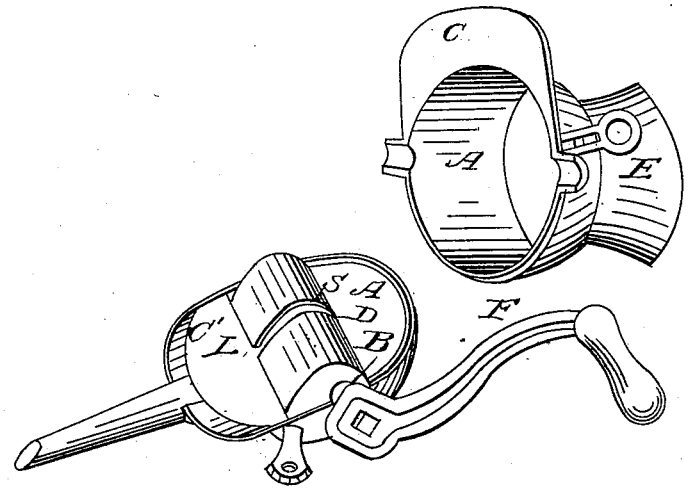
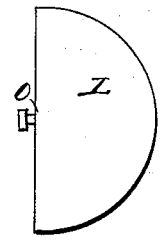
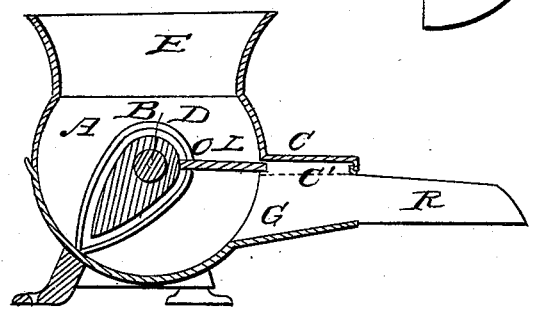
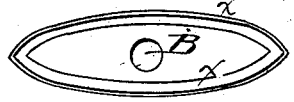

UNITED STATES PATENT OFFICE.

JOHN G. PERRY, OF SOUTH KINGSTON, RHODE ISLAND.

IMPROVED SAUSAGE-STUFFER.

Specification forming part of Letters Patent No. 39,244, dated July 14, 1863.

*To all whom it may concern:*

Be it known that I, JOHN G. PERRY, of South Kingston, in the county of Washington and State of Rhode Island, have invented a new and Improved Machine for Filling Sausages; and I do hereby declare that the following is a full and correct description thereof, reference being had to the accompanying drawings, and to the letters of reference marked thereon, the same letters denoting similar parts in all the figures.

Figure 1 is a perspective view of the machine, opened to show the inside. Fig. 2 is a vertical section through the middle of the machine across the shaft.

To construct my improved sausage filler I first make a case, A, for which a spherical form is preferred, but not essential. This case is divided through the middle into two parts, each part having on one side at the edge where they come together, a projecting flange, C C', which are provided with a raised edge, so that when the two parts of the case are put together a shallow chamber is formed between the two flanges. A shaft, B, is placed across the case in bearings in the sides. On this shaft is fastened the cam D, which is made to sweep the interior of the case when the shaft is turned. A plate, L, is made of proper shape to slide easily in the chamber between the two flanges C C', and has upon one edge, which is fitted to the face of the cam D, a tongue, O, with a projection on one or both sides of it. This tongue is fitted into a groove, S, in the face of the cam, the projection or projections on its side or sides entering into recesses $x\,x$ in the sides of the grooves in the cam (see Fig. 2) by which means the plate L is drawn back out of the chamber into the body of the case when the cam is turned around, it being pushed into the chamber by the face of the cam. A passage, G, is made through one of the flanges under the plate L, in which is placed one end of the tube or nozzle R, on which the skins or cases which are to be filled are put. A hopper, E, is placed on the top of the case to receive the meat, and a crank, F, is attached to the end of the shaft to turn it by.

The cam D may be made single, as shown in Figs. 1 and 2, and the slide L will be moved in and out of the chamber, and the case emptied once in each turn of the shaft; or it may be made double, as seen in section at Fig. 4, in which case the slide will be operated and the inside of the case cleared twice in each turn of the cam.

The operation of the filler is as follows:

The skins or cases to be filled being placed upon the nozzle R, and the hopper filled with meat, the crank F is turned, when the projection of the cam D carries the meat from the hopper down around toward the passage G, when, being prevented by the plate L from rising up into the hopper, it is forced by the cam out through the passage and nozzle into the cases, the plate L being pushed back into the chamber, between the flanges C C', by the cam, so as to allow it (the cam) to pass by when the plate is again drawn out by its tongue and projection, which catch in the recesses of the groove in the cam, so as to close the space between the cam and the chamber again.

Having thus described my improved sausage-filler, what I claim as my invention, and desire to secure by Letters Patent, is—

The combination of the cam D and plate L, substantially as herein described, and for the purposes set forth.

JOHN G. PERRY.

Witnesses:
O. H. PERRY,
JOHN F. ADAMS.